(12) United States Patent
Kinjo

(10) Patent No.: US 6,262,790 B1
(45) Date of Patent: Jul. 17, 2001

(54) PRINTING METHOD, PRINTER AND LENS-FITTED PHOTO FILM UNIT

(75) Inventor: Naoto Kinjo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/265,984

(22) Filed: Mar. 11, 1999

(30) Foreign Application Priority Data

Mar. 16, 1998 (JP) .................................................. 10-065709

(51) Int. Cl.⁷ .......................... G03B 27/52; G03B 27/24; G03B 17/02; G03B 17/24
(52) U.S. Cl. ................. 355/40; 396/6; 396/311; 396/319; 355/38; 355/41
(58) Field of Search .............. 396/6, 311, 319, 396/310, 512; 355/40, 41, 38, 52; 358/487, 506, 302

(56) References Cited

U.S. PATENT DOCUMENTS

| | | | |
|---|---|---|---|
| 4,260,245 * | 4/1981 | Hujer ...................................... | 355/40 |
| 4,274,732 * | 6/1981 | Thurm et al. .......................... | 355/38 |
| 5,223,891 * | 6/1993 | Fierstein et al. ....................... | 355/77 |
| 5,773,205 * | 6/1998 | Szajewski et al. .................... | 396/512 |
| 5,864,387 * | 1/1999 | Reed et al. ............................. | 355/40 |
| 5,968,719 * | 10/1999 | Nakamura ............................. | 396/310 |
| 5,974,190 * | 10/1999 | Maeda et al. ......................... | 396/311 |
| 6,018,381 * | 1/2000 | Vanderbrook et al. ................ | 355/40 |
| 6,021,277 * | 2/2000 | Sowinski et al. ...................... | 396/6 |

* cited by examiner

Primary Examiner—Alan A. Mathews

(57) ABSTRACT

A test frame is photographed on a filmstrip of a lens-fitted photo film unit through a taking lens of the film unit in factory. After the filmstrip is developed, image data is picked up from the test frame, and is compared to ideal image data of the test frame. Based on differences of the image data of the test frame from the ideal image data, correction data is produced to correct image data of picture frames photographed on the filmstrip by customers. Corrected image data is used for printing the picture frames.

23 Claims, 7 Drawing Sheets

IDEAL DENSITY HISTOGRAM

ACTUAL DENSITY HISTOGRAM

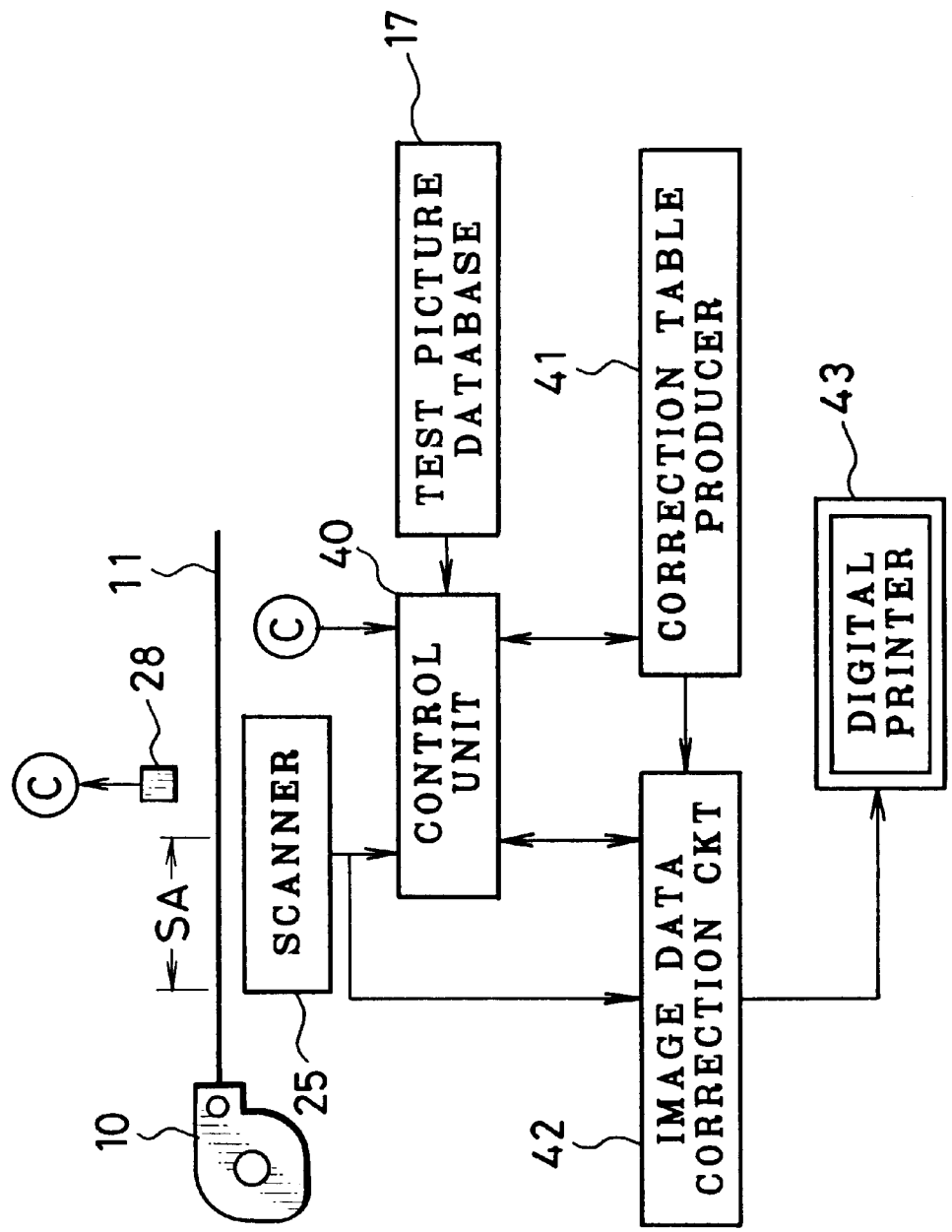

PRINTING METHOD, PRINTER AND LENS-FITTED PHOTO FILM UNIT

BACKGROUND OF THE INVENTION

1. Field of the Invention

The present invention relates to a printing method for a lens-fitted photo film unit, and a printer for the printing method, wherein a test frame is photographed on a filmstrip to control printing conditions of other pictures with reference to image conditions of the test frame after development.

2. Background Arts

It is known in the art that photo films in general have more or less different coloring characteristics even between those having the same film speed, according to the film manufacturer, the environments on manufacture and so forth. Besides, coloring densities of photo films vary depending upon development conditions. Therefore, in order to get adequate quality of prints from any photo films, it is necessary to compensate for the variations in the coloring characteristics. As one method for this purpose, a test frame or check pattern is optically recorded on the film at a photo-lab before the development, and correction values are derived from three color densities of the test frame measured after the development. The correction values are used for correcting three color exposure values on printing.

Such test frames have conventionally been used only for correcting the variation in the coloring densities of the film.

On the other hand, most of lens-fitted photo film units preloaded with a photo film cartridge and inexpensive cameras use a single element lens as a taking lens to cut their production cost. Because of aberrations of the single element taking lens, pictures taken by the lens-fitted photo film units are apt to have geographical distortions, obscured contour in peripheral areas, tonal distortions, density unevenness and the like.

SUMMARY OF THE INVENTION

In view of the foregoing, an object of the present invention is to provide a printing method for improving print quality made from pictures taken by the inexpensive cameras or the lens-fitted photo film units.

Another object of the present invention is to provide a printer and a lens-fitted photo film unit for use with the printing method of the invention.

To achieve the above objects, a printing method of the present invention consists of the following steps: recording a test frame photographically on a filmstrip of a lens-fitted photo film unit through a taking lens of the film unit in factory; picking up image data from the test frame after developing the filmstrip; detecting differences of the image data of the test frame from ideal characteristic value data assigned to the test frame; producing correction data from the differences; correcting image data of picture frames photographed on the filmstrip by customers by use of the correction data; and printing the picture frames by use of corrected image data.

The correction data is determined to correct at least one of tonal distortion, geometrical distortion, density unevenness and obscurity.

A lens-fitted photo film unit of the present invention is provided with a test frame photographed on a filmstrip of a preloaded photo film cartridge through a taking lens of the film unit in factory.

According to the present invention, a printer for making prints from picture frames of a photo filmstrip that is provided with a test frame, is provided with a device for picking up image data from the test frame; a device for detecting differences of the image data of the test frame from ideal image data of the test frame, and producing correction data from the differences; a device for picking up image data of picture frames photographed on the filmstrip; a device for correcting the image data of the picture frames by use of the correction data; and a device for printing the picture frames by use of corrected image data.

BRIEF DESCRIPTION OF THE DRAWINGS

The above and other objects and advantages of the present invention will become apparent from the following detailed description of the preferred embodiments, when read in connection with the accompanying drawings which are given by way of illustration only and thus are not limitative of the present invention, wherein like reference numerals designate like or corresponding parts throughout the several views, and wherein:

FIG. 11 is a schematic diagram of a device for detecting correction data from the test frame of the film unit.

DETAILED DESCRIPTION OF THE PREFERRED EMBODIMENT

Figure 1:
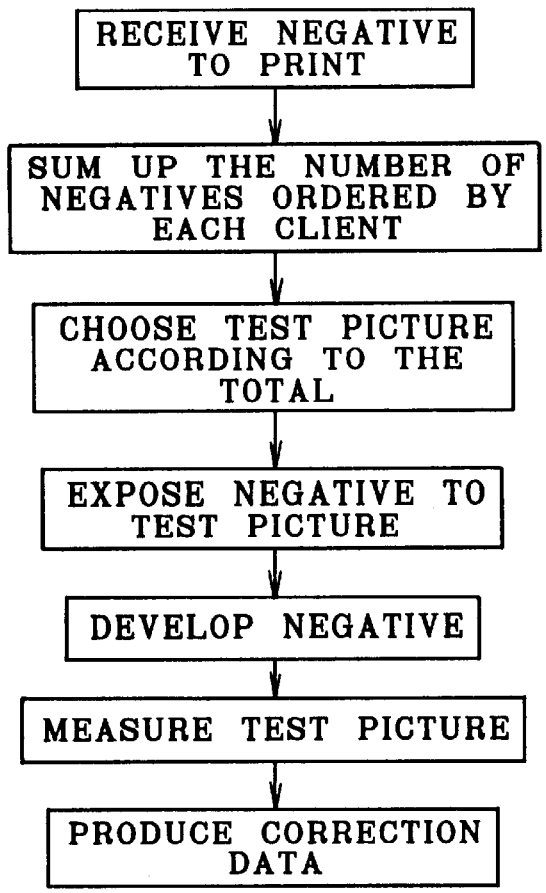
FIG. 1 is a flow chart illustrating a sequence of producing correction data by use of a test frame recorded on a filmstrip.

As shown in FIG. 1, an exposed filmstrip is forwarded to a photofinisher or its agency for printing. The photofinisher enters client ID data and order content data through a reception processing device. The reception processing device produces a client database from entered contents of orders.

The client ID data is used to identify each individual client, and is initially registered at the photofinisher with other information about the client, such as client's address, age, sex etc. It is preferable to record the client ID data on a memory card, and issue it as an ID card to each client. Then, the photofinisher can enter the user ID data without fail by use of the ID card. The client database consists of a plurality of data files, one file for each client. Each data file consists of the date of printing order, the type of film such as the manufacturer, the film speed, and the film length, the type of print, and the bill. The data file also includes the total number that have been ordered by the same client.

As for the IX240 type filmstrips, it is possible to provide a camera with a data setup device for setting up the client ID data, and record the client ID data on a transparent magnetic recording layer of the filmstrip automatically by the camera. It is also possible that the camera sums up the number of filmstrips that have been exposed by the camera, and records the total on the magnetic recording layer of the IX240 type film.

The photofinisher stores data of a large number of test frames. The test frames preferably contain pictorial images that many people would be pleased to get, e.g., famous landscapes, famous constructions, portraits of celebrities such as popular actors, actresses, sports players and so forth. By choosing one test frame from among the stored test frames according to the total number of filmstrips, a different kind of test frame is chosen for each filmstrip of the same client, so each client may not get the same kind of complimentary photograph as before, but may get a different kind of complimentary photograph. Because the clients have different tests in photographs from each other, it is desirable to enter the preference of each individual client in the database, and choose a test frame from those preferable for the client. It is possible to put an ad in the test frame.

It may be necessary to prepare many kinds of test frames such that an ordinary capacity memory of a small-scale photo lab is not sufficient to store and manage all of the test frames. Therefore, the small-scale photo-lab had better to store and manage data of those test frames which are frequently used, whereas a photo-lab center stores and manages data of those being rarely used. The small-scale photo-lab retrieves the data of the test frame from the photo-lab center through a communication circuit. Networking small-scale photo-labs through the photo-lab center makes it easy to revise the test frames simultaneously in every photo-lab.

A test frame is selected from the stored test frames according to the total of the filmstrips that the client have ever ordered to print, while considering the client's taste. The test frame is optically recorded on an unexposed leading or trailing end portion of the filmstrip by a video printer, e.g. a Laser printer, a CRT printer, an LCD printer. The video printer controls exposure according to the film speed. Ideal characteristic value data is appended to each test frame. The ideal characteristic values may be ideal densities and color distributions of the test frame, ideal pixel densities of the image of the test frame, or ideal densities of the consequent print.

When the filmstrip is of IX240 type, the ideal characteristic value data is written on the magnetic recording layer of the filmstrip. When the filmstrip is of ISO135 type, the ideal characteristic value data is written on a memory of a device for calculating correction values. In that case, an ID number is given to each individual test frame and its ideal characteristic value data, so the ID number is used as an address for retrieving the ideal characteristic value data from the memory.

After the test frame is recorded, the filmstrip is developed in a film processor. The developed filmstrip is put in a scanner to measure the densities of the test frame. Then, correction data is derived from differences between the measured values and the ideal characteristic values, the differences being dependent upon the condition of development and the film type.

As the correction data, a correction table is used for the digital printers, and well-known exposure correction values are used for frame exposure type printers. In the correction table, each level of measured actual densities, (i.e., image data of the test frame) are correlated with corrected densities (i.e., normalized image data). Thus, image data of picture frames to print may be converted into corrected image data through the correction table. As for color images, it is necessary to correct color balance and density, so that the correction data is produced for each of the three primary colors. As for black-and-white images, the correction data is used for density correction only.

The correction data is transferred to the printer by way of a cable system or a radio system, or a recording medium like a memory card. Concerning the IX240 type filmstrips, the correction data may be written on the magnetic recording layer. Then, the correction data is available on reprinting.

When pictures are printed on photographic paper in the printer, density and color balance of the test frame and the picture frames to print are corrected by use of the correction data. An add copy may be printed on the obverse or the reverse surface of the photographic paper. It is possible to write data of the add copy on the magnetic recording layer of the IX240 type filmstrip.

Figure 2:
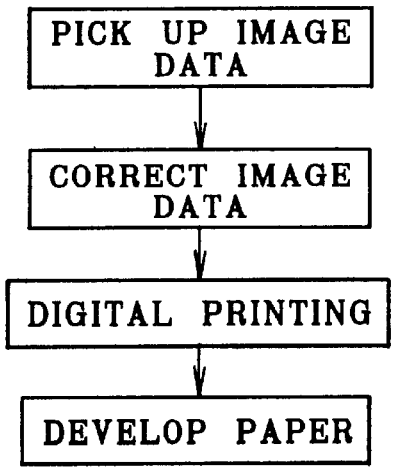
FIG. 2 is a flow chart illustrating a sequence of digital printing.

As shown in FIG. 2, when using a digital video printer, image data of the test frame and the picture frames to print is picked up by the scanner, and is corrected by use of the correction table. The digital video printer makes prints of the test frame and the other picture frames based on the corrected image data. In the frame exposure printer, the exposure amount is controlled by changing exposure time or filter insertion amounts according to exposure correction values that are derived from differences between actually measured LATD (Large Area Transmittance Density) and ideal LATD included in the ideal characteristic value data.

Figure 3:
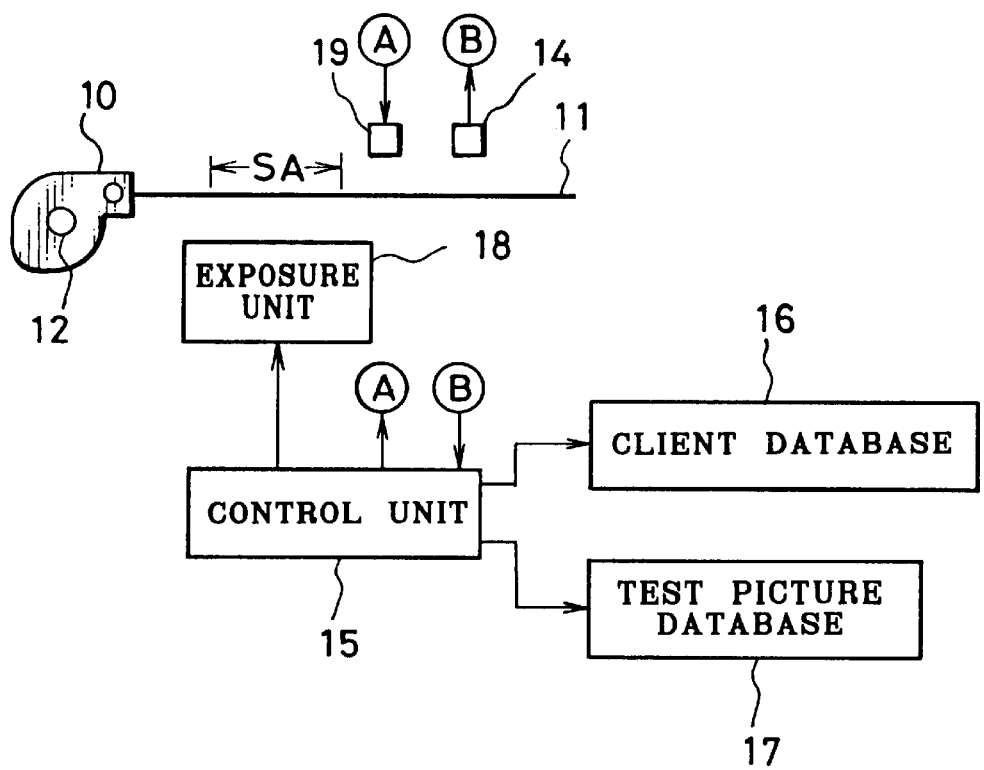
FIG. 3 is a schematic diagram of a recording device for photographically recording test frames on filmstrips.

FIG. 3 shows an embodiment of a recording device for photographically recording test frames on filmstrips. An IX240 type photo film cartridge 10 contains a filmstrip 11 exposed by a client. When a spool 12 of the cartridge 10 is rotated in an unwinding direction, the exposed filmstrip 11 is advanced out of the cartridge 10. As a trailing end portion SA of the IX240 type filmstrip 11 is maintained unexposed by the camera, a test frame is recorded on the trailing end portion SA.

Client ID data is recorded on a magnetic recording layer of the filmstrip 11 by the camera or the reception processing device. The client ID data is read through a reading head 14, and is sent to a control unit 15. The control unit 15 retrieves the total number of filmstrips that have been ordered to print by the client from a client database 16 using the client ID data. Thereafter, the control unit 15 counts up the total of the filmstrips by one. The client database 16 consists of the total number of filmstrips that have been ordered by the individual client, in association with information about the individual client. After counting up the total of the filmstrips, the control unit 15 reads out the total from the client database 16.

A test frame database 17 stores image data of a plurality of test frames and ideal characteristic value data of each test frame, wherein the test frames are grouped such that one group is allocated to each number of totals of the filmstrips. The control unit 15 reads out data of one of the test frames and its ideal characteristic value data from the test frame database 17. The image data is sent to an exposure unit 18, whereas the ideal characteristic value data are sent to a writing head 19.

In this embodiment, the exposure unit 18 is a Laser type digital video printer. The exposure unit 18 records the selected test frame on the unexposed trailing end portion SA of the filmstrip 11 at an exposure value determined by the speed of the filmstrip 11, such that the pixel densities of the test frame would be ideal if the coloring characteristics of the filmstrip 11 are normal, and the developing condition is ideal.

As the ideal characteristic value data, positions of designated pixels and ideal density of each of the designated pixels are used for the digital video printer. The ideal characteristic value data is written on the magnetic recording layer of the filmstrip 11 by the writing head 19. After the test frame is recorded in this way, the filmstrip 11 is developed by a film processor.

Figure 4:
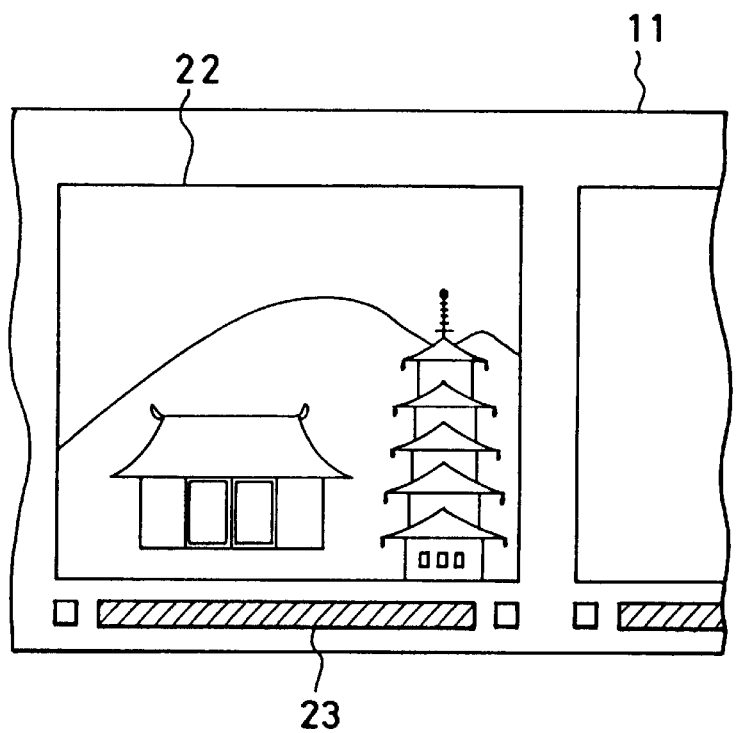
FIG. 4 is an explanatory view of a test frame recorded on a filmstrip.

FIG. 4 shows an example of test frame 22, wherein the ideal characteristic value data concerning this test frame 22 is recorded on a magnetic track 23 on one side of the test frame 22.

Figure 5:
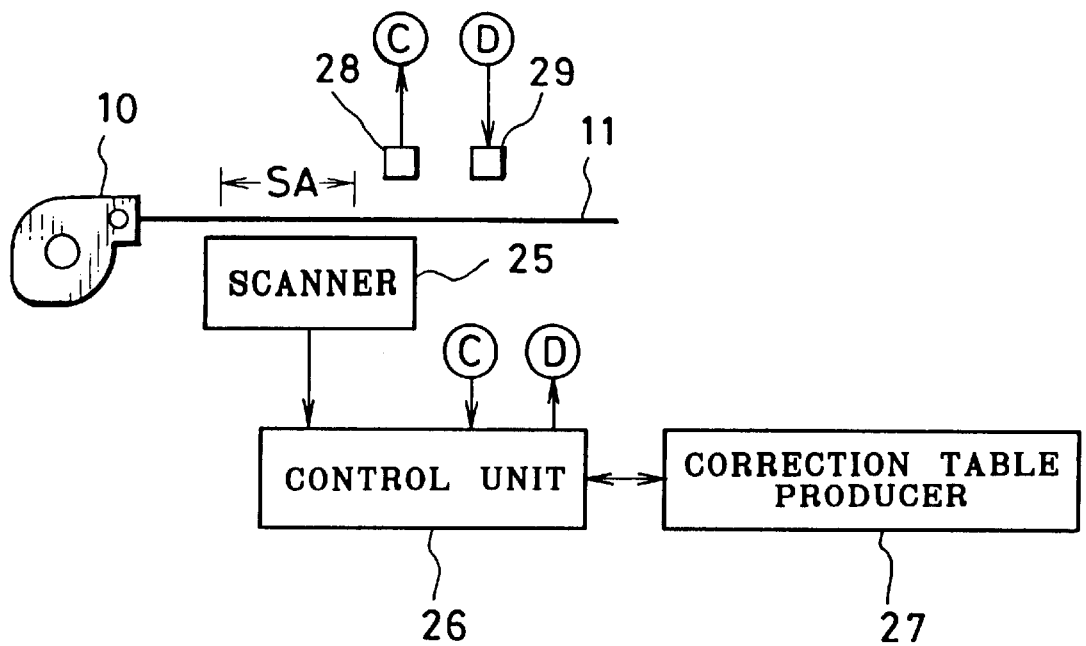
FIG. 5 is a schematic diagram of a device for detecting correction data from the test frame recorded on the filmstrip.

FIG. 5 shows a device for detecting correction data based on image data of the test frame 22, which is recorded on the trailing end portion SA in this instance. A scanner 25 consists of a lens system and an imaging device, and measures density of each pixel of the test frame 22 on the filmstrip 11. The measured actual densities of the test frame 22 are fed to a correction table producer 27 through a control unit 26. Simultaneously, a reading head 28 reads out the ideal characteristic value data from the magnetic track 23, and sends it to the correction table producer 27 through the controller 26. It is preferable to include data defining the size of each pixel in the ideal characteristic value data.

The correction table producer 27 extracts from the measured densities of the test frame 22, densities of those pixels designated by the ideal characteristic value data. If the coloring characteristics of the filmstrip 11 are normal, and the developing condition is ideal, the measured densities would be equal to the ideal densities of the same pixels, as implied by dashed line in FIG. 6.

Figure 6:
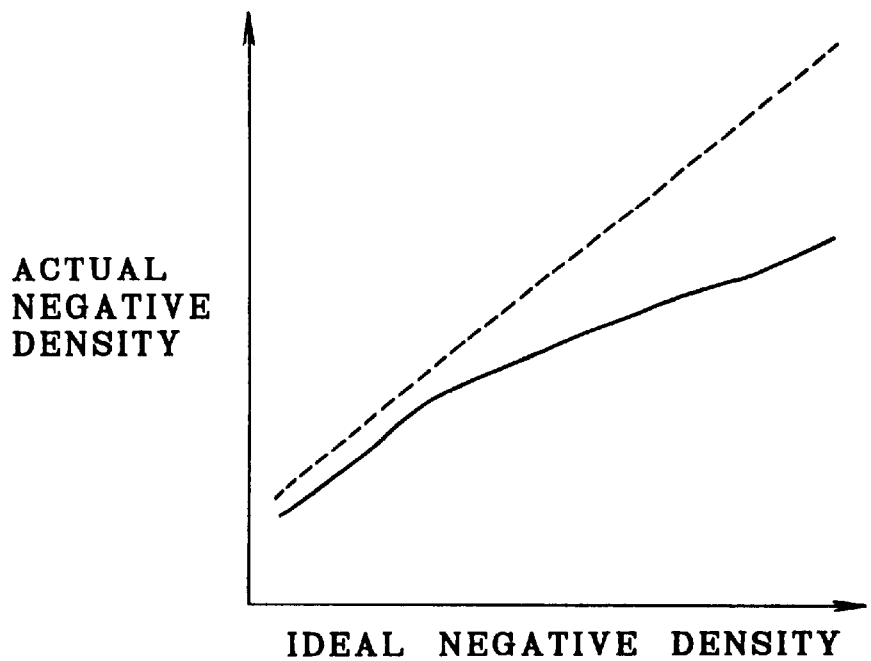
FIG. 6 is a graph showing a relationship between ideal densities of a test frame and actual densities measured from the test frame recorded on a filmstrip.

In practice, because of the variation in the coloring characteristics and in the developing conditions, the actual densities of the test frame is diverse from the ideal characteristic curve as shown for example by a solid line in FIG. 6. Thus, a difference between the actual value and the ideal value is detected as a correction value at each density level. In this example, the actual densities are lower than the ideal densities in the whole range. Therefore, a deficiency of density is calculated at each designated pixel to produce a correction table corresponding to a conversion curve shown by slid line in FIG. 7. The correction table is written on the magnetic track 23 by a writing head 29.

Figure 7:
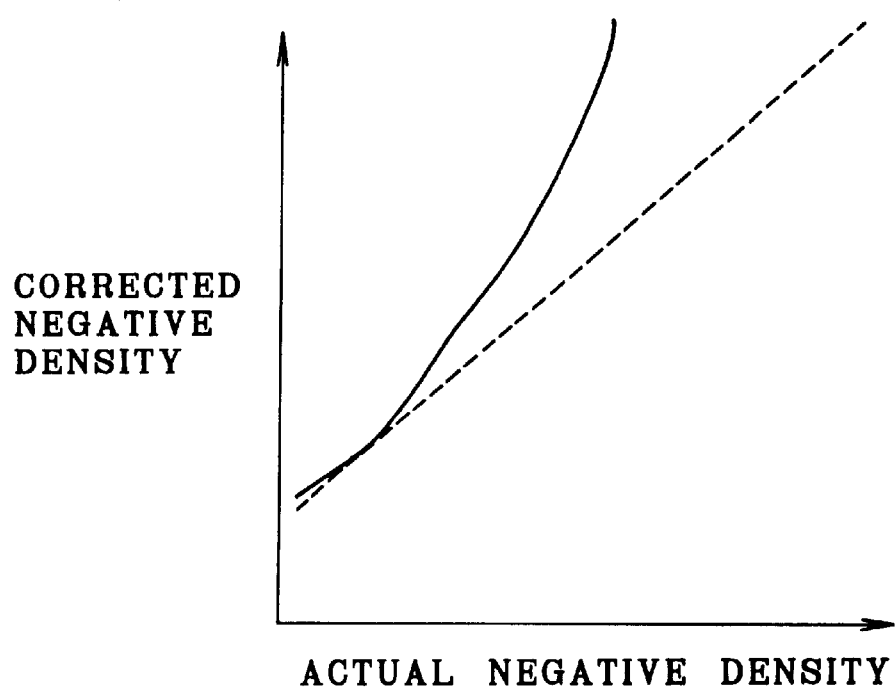
FIG. 7 is a graph showing a relationship between the actual densities and corrected densities.

To print the test frame and the other picture frames, the photo film cartridge 10 is put, for instance, in a Laser type digital video printer. Then, the digital video printer reads out the correction table from the magnetic track 23. By use of the correction table, the image data of each pixel, which corresponds to an actual density of FIG. 7, is converted into corrected image data, which corresponds to a corrected density of FIG. 7. Intensity of the Laser beam is modified in accordance with the corrected image data, printing the test frame and the other picture frames on photographic paper.

Although the correction data detecting device of FIG. 5 is separate from the printer, it is possible to incorporate such a device into a printer. In that case, a scanner should be placed before a printing station of the printer, and a correction table is written in a table memory.

Figure 8:
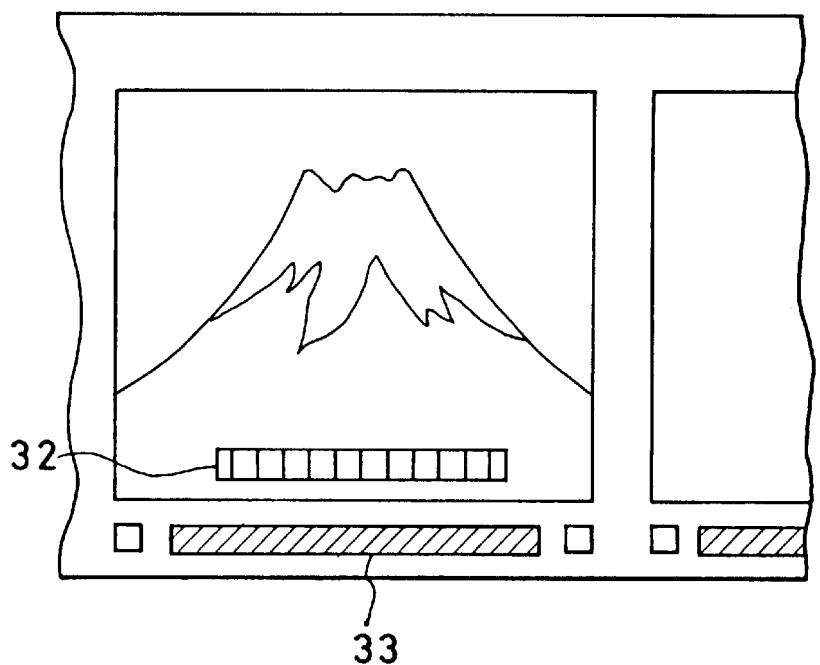
FIG. 8 is an explanatory view of a test frame having a density chart therein.

According to another embodiment shown in FIG. 8, a density chart 32 is recorded in combination with a test frame, and ideal densities of the density chart 32 is recorded on a magnetic track 33. Actual densities are measured from the density chart 32. A correction table is produced from differences between the actual densities and the ideal densities, in the same way as above.

Figure 9A:
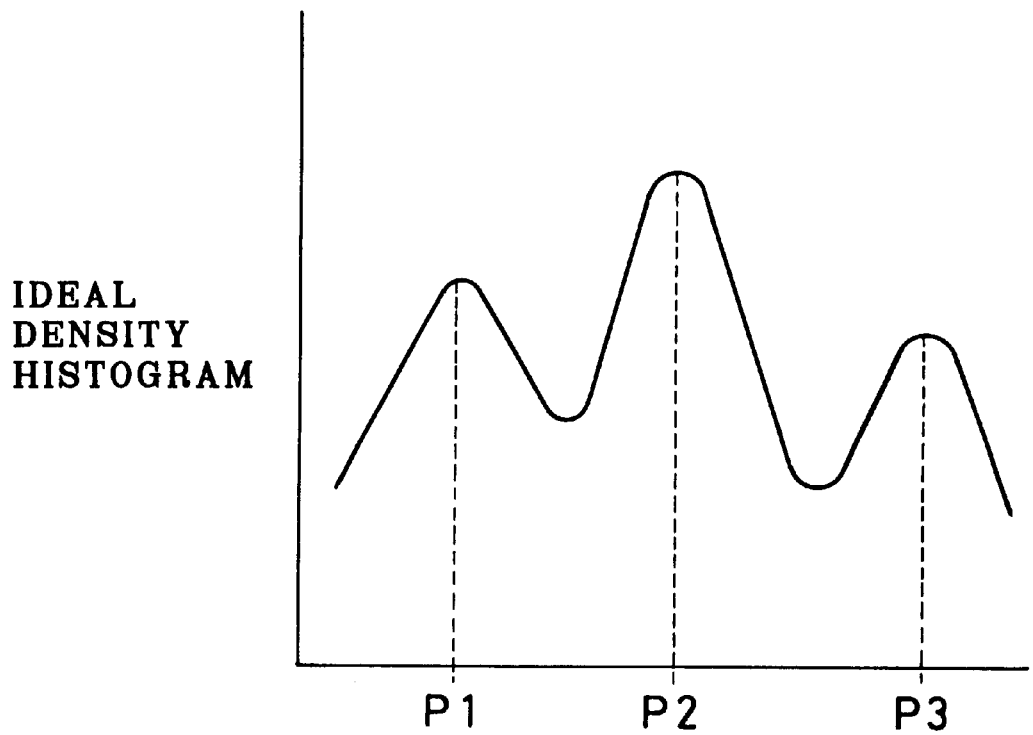
FIG. 9A is an ideal density histogram of a test frame.
Figure 9B:
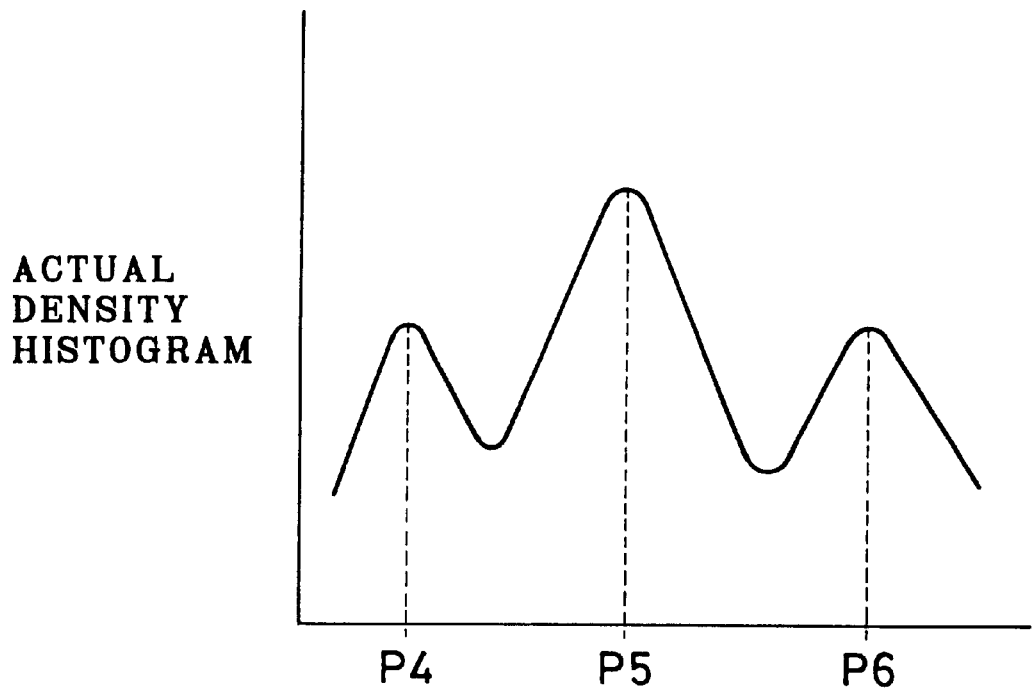
FIG. 9B is an actual density histogram obtained from the test frame recorded on a filmstrip.

It is possible to use a density histogram for detecting correction data. FIG. 9A shows an example of an ideal density histogram appended to a test frame. Peak values P1, P2 and P3 of the ideal density histogram are written as ideal characteristic value data on a magnetic track of the filmstrip 11 besides the test frame. After the filmstrip 11 is developed, pixel densities of the test frame are measured to get a density histogram. FIG. 9B shows an example of density histogram of the test frame. A correction table is produced from the deviations of peak values P4, P5 and P6 of the actual density histogram from the peak values P1, P2 and P3 of the ideal density histogram.

By correcting tonal distortions, variations in film characteristics between different film manufacturers, different film types, different lot numbers, and different developing machines are canceled. Thereby, the film characteristics are normalized, and also the color balance is corrected.

It has been proved that ordinary people use less than a dozen filmstrips. Therefore, if all the test frames are renewed every month, the client mostly get a different complimentary photograph for each exposed filmstrip. Therefore, it is possible to record the test frame on the individual filmstrip during the manufacture, while renewing the test frame at regular intervals.

As for the IX240 type filmstrip, the manufacturer may record the ideal characteristic value data on the magnetic recording layer when recording the test frame at the factory. As for the 135 type filmstrip, the manufacturer photographically records an ID number of each kind of test frame along with the test frame, and provides the photo-labs with a table showing a relationship between ID numbers and respective kinds of test frames, as well as ideal characteristic value data of the respective kinds of test frames. Thus, the photofinisher retrieves the ideal characteristic value data in correspondence with the ID number, and uses it for controlling printing conditions.

It is possible to record the ID number of the test frame on the magnetic recording layer of the IX240 filmstrip. It is also possible to identify the test frame by the picture pattern matching, instead of the ID number. It is preferable to read the photographically recorded ID number through an opt-electronic reading device such as an alphanumeric reader.

Figure 10:
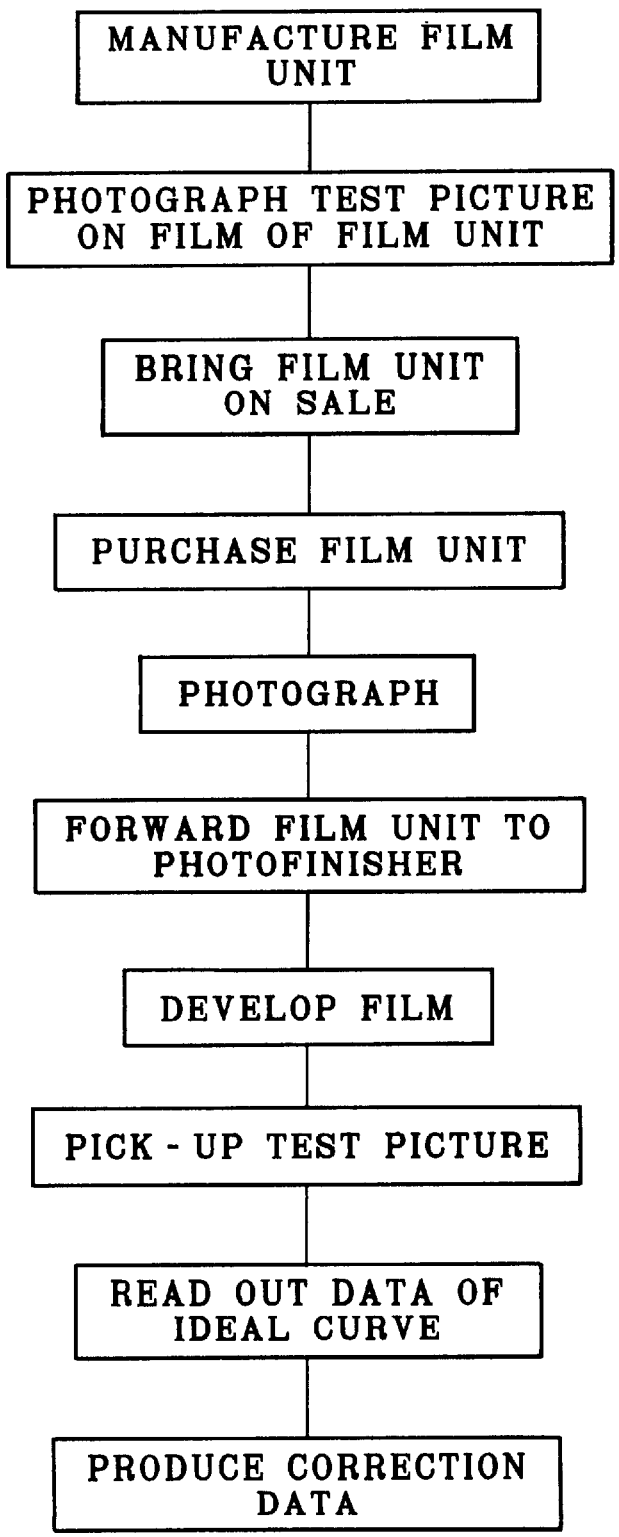
FIG. 10 is a flow chart illustrating a sequence of manufacturing a film unit with a test frame recorded on its filmstrip, and producing correction data by use of the test frame.

When applying the present invention to a lens-fitted photo film unit, a test frame is photographed through a taking lens of the film unit onto a filmstrip of the film unit in the factory before the shipment, as shown in FIG. 10. The ideal characteristic value data or the ID number of the test frame may be magnetically or photographically recorded on the filmstrip in the way as described above before loading the filmstrip in a housing of the film unit.

After the filmstrip is loaded and the film unit passes an inspection process, a test frame is photographed through the taking lens of the film unit. Thereafter, the film unit is packed in a gazette and brought on sale. It is preferable to provide the gazette of the film unit with information on what kind of photograph will be added as a compliment to photographs taken by the film unit. It may be preferable to use landscapes and characters relating to the place where the film units are sold.

A customer who purchases the film unit of the invention takes photographs as usual and, after taking all available frames, forwards the film unit to a photofinisher for development and printing. The photofinisher removes a photo film cartridge from the film unit and subjects a filmstrip of the photo film cartridge to a developing process. Thereafter, as shown in FIG. 11, image data is picked up from the test frame of the developed filmstrip 11 as well as from other customer's frames through a scanner 25. Simultaneously, a reading head 28 reads out an ID number of the test frame from the magnetic recording layer of the filmstrip 11. With reference to the ID number of the test frame, ideal characteristic value data of an original test frame of the developed test frame is read out from a test frame database 17, and is sent to a correction table producer 41 through a control unit 40.

The correction table producer 41 compares the image data of the developed test frame with the ideal characteristic value data, and produces gradation correction data in the same way as described with respect to the correction data detecting device of FIG. 5. The correction data producer 41 also produces correction data for geographical distortion due to the aberration of the taking lens from differences in size from the original, as well as correction data for correcting obscured contour, tonal distortions, and density unevenness.

Specifically, in order to correct geographical distortions, deviations of reference points of the developed test frame from corresponding reference points of the original are detected by use of coordinate values of the original reference points included in the ideal characteristic value data. Then, the deviations are represented by approximate expressions to use as distortion conversion curves. Concretely, if the reference point of the developed test frame is detected to be (xi', yi'), whereas the original reference point is (xi, yi), a relation between (xi, yi) and (xi', yi') is derived therefrom. Based on the relation, pixel data of the reference point of the developed test frame is used for printing a pixel at the original reference point. For example, the test frame has checkers in the whole area, so cross points of the checkers are used as the reference points.

It is possible to divide the test frame into blocks when the test frame contains a natural or pictorial image. Then, pattern matching between the original test frame and the test frame on the filmstrip is made in each block by two-dimensional displacement, so as to obtain vectors representative of deviations of the respective blocks. It is alternatively possible to obtain the deviation vectors by comparing differential image data of the original test frame with that of the test frame on the filmstrip. Based on the deviation amounts, respective pixel positions are corrected in image data of the test frame and other frames photographed on the same filmstrip, and the corrected image data is used for digital printing. In this way, the geographical distortions due to the inexpensive taking lens and differences between the taking lenses as well as those between the film units are corrected.

Density unevenness is corrected by measuring density differences between pixels of the original test frame and corresponding pixels of the test frame on the filmstrip, detecting two-dimensional distribution of the density differences on the frame, and determining density correction data so as to cancel the density differences. The density unevenness correction is carried out on the respective three colors.

For example, the test frame has small parts of the same density distributed over the whole area. In that case, it is desirable to correct the geographical distortion before the density unevenness correction process. When the test frame contains a pictorial image, it is desirable to correct the geographical distortion and also the tonal distortion before the density unevenness correction process. The density unevenness correction compensates for light amount decreasing in a peripheral area due to the cheap taking lens.

To correct the obscurity, edge portions are extracted from the ideal characteristic values of the original test frame, and sharpness in those areas of the test frame on the filmstrip which correspond to the extracted edges is checked by use of differential filtering or the like. If the sharpness of some of those areas is less than the sharpness of the corresponding edge portions of the original test frame by a predetermined threshold value, the area is considered to be obscure. Then, parameters for edge enhancement are determined depending upon the degree of obscurity, and image data of the corresponding areas are subjected to edge enhancement by use of the parameters.

In the way as above, the correction table producer 41 produces correction data for tonal distortion, geometrical distortion, density unevenness and obscurity. Then, the image data obtained by the scanner 25 from the individual frames to print is corrected on the basis of the respective kinds of correction data in an image data correction circuit 42. Corrected image data is sent to a digital printer 43 to make prints of the individual frames. The same correction data is used for all of the frames of the same filmstrip in the image data correction circuit 42. When the test frame contains a pictorial image, a photo print of the test frame may be forwarded as a complimentary photograph to the customer together with other photo prints.

Instead of recording the ID number of the test frame on the filmstrip of the film unit, it is possible to record data of the ideal characteristic values on the filmstrip.

In the above embodiments, the photofinisher is assumed to use a silver-salt digital printer, the present invention is applicable to thermal developing-transferring type color printers, color thermal printer, and color Laser printers.

As described so far, the present invention should not be limited to the embodiments shown in the drawings but, on the contrary, various modifications will be possible for people skilled in the art without departing from the scope of claims attached hereto.

What is claimed is:

1. A printing method comprising the steps of:
    recording a test frame photographically on a filmstrip of a lens-fitted photo film unit through a taking lens of said film unit in a factory;
    reading image data from said test frame after developing said filmstrip;
    detecting differences of said image data of said test frame from ideal characteristic value data assigned to said test frame;
    producing correction data from said differences;
    correcting image data of picture frames photographed on said filmstrip by users using said correction data; and
    printing said picture frames using corrected image data.

2. A printing method as claimed in claim 1, wherein said correction data is determined to correct at least one of tonal distortion, geometrical distortion, density unevenness and obscurity.

3. A printing method as claimed in claim 1, further comprising the steps of providing ID data of said test frame on said film unit, and identifying said ideal characteristic value data assigned to said test frame by use of said ID data.

4. A printing method as claimed in claim 1, further comprising the steps of recording said ideal characteristic value data on a magnetic recording layer of said filmstrip, and reading said ideal characteristic value data from said magnetic recording layer.

5. A printing method as claimed in claim 1, wherein said test frame contains a pictorial image, and said image data of said test frame is corrected by said correction data, and said test frame is printed by use of corrected image data of said test frame to serve as a complimentary photograph.

6. The method of claim 1 wherein said ideal characteristic value data is pre-stored.

7. The method of claim 1 wherein said ideal characteristic value data is pre-stored in association with said test frame.

8. The method of claim 7 wherein said ideal characteristic data is pre-stored on a magnetic track.

9. A printing method comprising the steps of:

recording a test frame photographically on a filmstrip in a factory;

reading image data from said test frame after developing said filmstrip;

detecting differences of said image data of said test frame from ideal characteristic value data assigned to said test frame;

producing correction data from said differences;

correcting image data of picture frames photographed on said filmstrip by users using said correction data; and printing said picture frames using corrected image data.

10. A printing method as claimed in claim 9, further comprising the steps of providing ID data of said test frame on said film unit, and identifying said ideal characteristic value data assigned to said test frame by use of said ID data.

11. The method of claim 9 wherein said ideal characteristic value data is pre-stored.

12. The method of claim 9 wherein said ideal characteristic value data is pre-stored in association with said test frame.

13. The method of claim 12 wherein said ideal characteristics data is pre-stored on a magnetic.

14. A lens-fitted photo film unit comprising:

a unit housing having a taking lens and simple photographic mechanisms;

a photo film cartridge loaded in said unit housing in a factory; and a test frame photographed on a filmstrip of said photo film cartridge through said taking lens in a factory, said test frame being used during a printing process in association with ideal characteristic value data assigned to said test frame for correcting image distortions of picture frames photographed on said filmstrip by users.

15. The method of claim 14 wherein said ideal characteristic value data is pre-stored.

16. The method of claim 14 wherein said ideal characteristic value data is pre-stored in association with said test frame.

17. The method of claim 16 wherein said ideal characteristic data is pre-stored on a magnetic track.

18. A printer for making prints from picture frames of a photo filmstrip that is provided with a test frame, said printer comprising:

an imaging device for reading image data from picture frames photographed on said filmstrip including said test frame;

a data processing device for detecting differences of said image data of said test frame from ideal image data of said test frame, and producing correction data from said differences;

a correction device for correcting said image data of said picture frames by use of said correction data; and a printing device for printing said picture frames by use of corrected image data.

19. A printer as claimed in claim 18, wherein said data processing device produces said correction data from said differences so as to correct at least one of tonal distortion, geometrical distortion, density unevenness and obscurity of said test picture.

20. A printer as claimed in claim 19, further comprising a memory device for storing ideal image data of a plurality of test frames and a reading device for reading ID data of said test frame from said filmstrip, wherein said ideal image data of said test frame photographed on said filmstrip is read out from said memory device with reference to said ID data.

21. The method of claim 18 wherein said ideal characteristic value date is pre-stored.

22. The method of claim 18 wherein said ideal characteristic value data is pre-stored in association with said test frame.

23. The method of claim 22 wherein said ideal characteristic data is pre-stored on a magnetic track.

* * * * *